United States Patent [19]
Fujii et al.

[11] Patent Number: 5,895,123
[45] Date of Patent: Apr. 20, 1999

[54] INFORMATION RECORDING/REPRODUCTION APPARATUS FOR REPRODUCING PICTURE AND AUDIO SIGNALS IN SYNCHRONIZATION

[75] Inventors: Akio Fujii, Yokohama; Yushi Kaneko, Kawasaki, both of Japan

[73] Assignee: Canon Kabushiki Kaisha, Tokyo, Japan

[21] Appl. No.: 08/302,010

[22] Filed: Sep. 9, 1994

Related U.S. Application Data

[63] Continuation of application No. 07/939,703, Sep. 2, 1992, abandoned.

[30] Foreign Application Priority Data

| Sep. 3, 1991 | [JP] | Japan | 3-222617 |
| Sep. 24, 1991 | [JP] | Japan | 3-243031 |
| Oct. 23, 1991 | [JP] | Japan | 3-275113 |

[51] Int. Cl.$^6$ .............................. H04N 5/91; H04N 5/928
[52] U.S. Cl. ............................................ 386/96; 386/104
[58] Field of Search .................................. 358/341, 343, 358/342, 335, 311; 360/19.1; 386/75, 96, 99, 39, 104

[56] References Cited

U.S. PATENT DOCUMENTS

| 4,701,785 | 10/1987 | Willis | 358/31 |
| 4,703,355 | 10/1987 | Cooper | 358/149 |
| 4,777,537 | 10/1988 | Ueno et al. | 358/341 |
| 4,862,269 | 8/1989 | Sonoda et al. | 358/160 |
| 4,879,611 | 11/1989 | Fukui et al. | 360/69 |
| 4,918,530 | 4/1990 | Barton et al. | 358/183 |
| 4,982,279 | 1/1991 | Ishii et al. | 358/160 |
| 4,982,286 | 1/1991 | Iwabuchi et al. | 358/160 |
| 5,038,217 | 8/1991 | Hayashi et al. | 358/341 |

FOREIGN PATENT DOCUMENTS

| 56 48766 | 5/1981 | Japan . |
| 57 73578 | 5/1982 | Japan . |

*Primary Examiner*—Robert Chevalier
*Attorney, Agent, or Firm*—Fitzpatrick, Cella, Harper & Scinto

[57] ABSTRACT

An information recording/reproducing apparatus for reproducing picture and audio signals in synchronization reproduces audio/still-picture information which has been recorded onto a recording medium in a receiving order and in a time-sharing manner. Still-picture reproduction circuitry is provided for reproducing the still-picture from a designated reproduction starting position on the recording medium in accordance with a designated still-picture reproduction starting position. Detection circuitry is provided for detecting an audio synchronization signal from audio packets positioned on the recording medium after the still-picture packet to be reproduced. Sound reproduction circuitry is provided for reproducing audio data from an audio packet positioned on the recording medium after the audio packet which contains the detected audio synchronizing signal.

12 Claims, 11 Drawing Sheets

| ID1 | KIND OF PROGRAM | ID2 | TRANSMISSION TIME | DISPLAY TIME | WRITE-START ADDRESS |
|---|---|---|---|---|---|
| 1 | xxx -- -- -- | 1 2 3 -- | xx:xx:xx xx:xx:xx xx:xx:xx -- | xx:xx:xx xx:xx:xx xx:xx:xx -- | xxxxx xxxxx xxxxx xxxxx xxxxx xxxxx -- |
| 2 | xxx xxx -- -- | 1 2 -- | xx:xx:xx xx:xx:xx -- | xx:xx:xx xx:xx:xx -- | xxxxx xxxxx xxxxx xxxxx -- |

FIG. 5

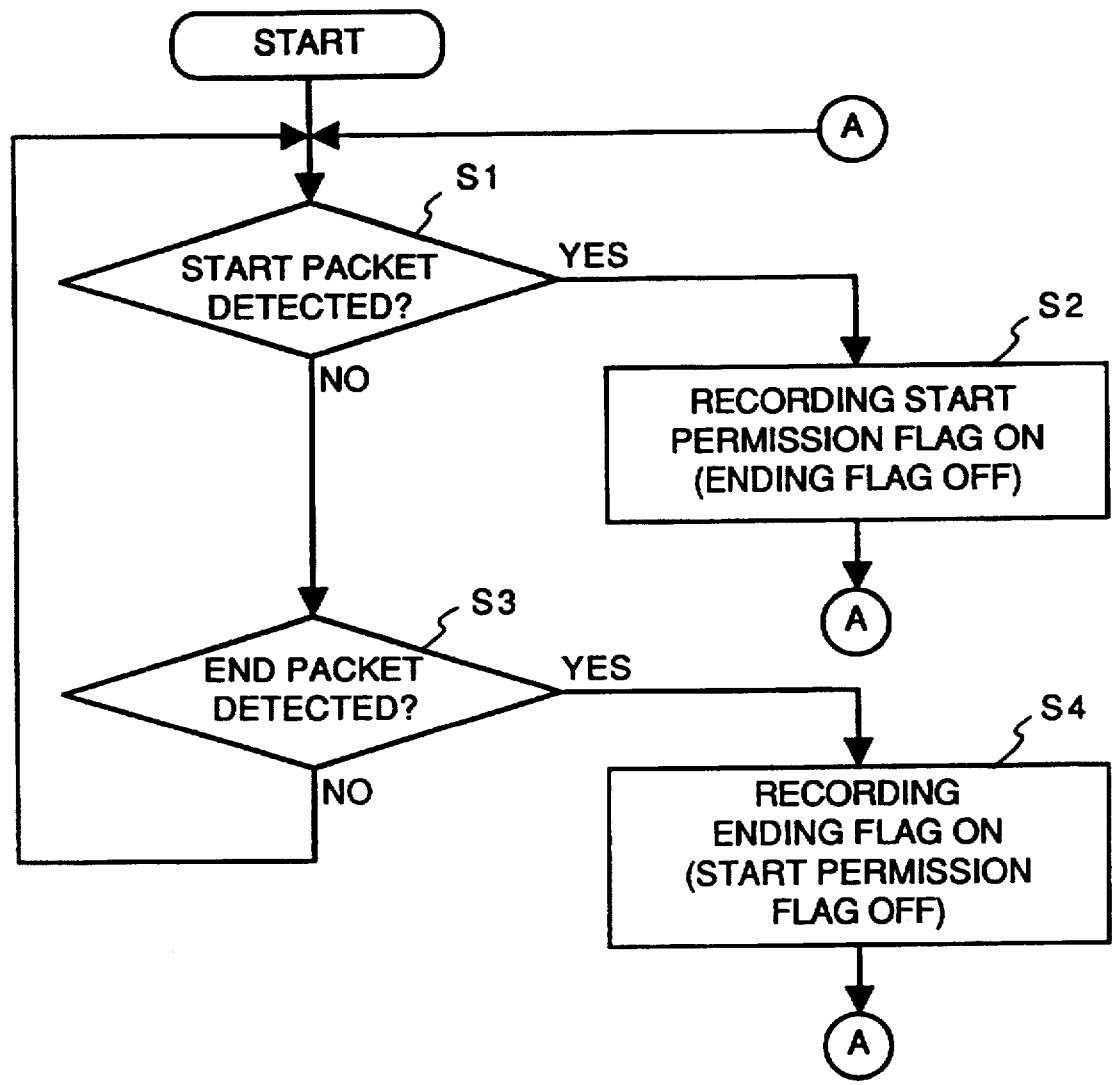
F I G. 6

| PROGRAM 1 | ::** |
| PROGRAM 2 | ::** |
| ⋮ | ⋮ |

F I G. 9A

| PROGRAM 1 | |
|---|---|
| STILL-PICTURE 1 | ::** |
| STILL-PICTURE 2 | ::** |
| STILL-PICTURE 3 | ::** |

F I G. 9B

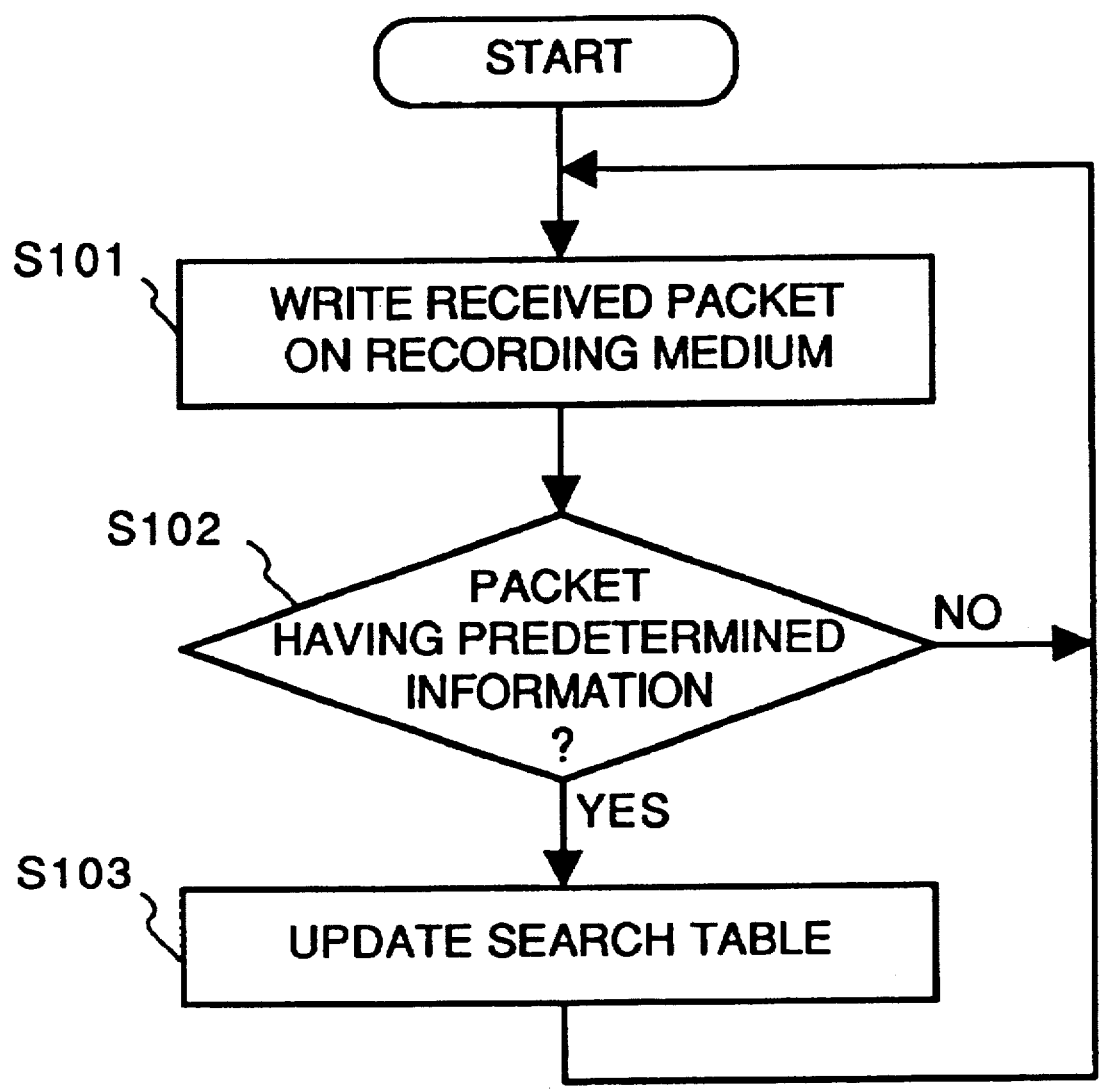
F I G. 11

INFORMATION RECORDING/ REPRODUCTION APPARATUS FOR REPRODUCING PICTURE AND AUDIO SIGNALS IN SYNCHRONIZATION

This application is a continuation of application Ser. No. 07/939,703 filed Sep. 2, 1992, now abandoned.

BACKGROUND OF THE INVENTION

The present invention relates to an information recording/ reproducing apparatus and, more particularly to an information reproducing apparatus which records an audio still-picture program on a predetermined recording medium.

Audio still-picture programs having highly precise still pictures and various display effects for updating the still picture of interest (by cutting, scrolling, wiping, dissolving, etc.) rather than merely changing over the screen can be provided in the form of digital data as one or are packet transmitted through a communication satellite channel or CATV.

In the case of a still-picture program, an audio still-picture program, in particular, digital data representing sound and image are sent in the form of packet type data. The format of this packet is shown in FIG. 3.

As shown in FIG. 3, one frame (=2048 bits) includes 7 packets. The leading 16 bits of this frame are used for a synchronizing signal FS. Another 16 bits are further attached to the synchronizing signal FS as a frame control signal FC. The frame control signal FC contains additional information such as mode information.

Furthermore, one packet (288 bits) is comprised of 16-bit headers HA and HS, 174-bit data portion, and 82-bit error correction data. The header HA indicates an attribute of the packet, that is, a kind of service (i.e. whether the packet is an audio still-picture program). The header HS is information indicating a kind of packet in the attribute indicated by the header HA. If the header HS is examined, it can be determined whether information in the data portion located immediately after the header HS is program control data. In the case of an audio still-picture program, if the header HS is examined, it can be determined whether the data which is located immediately after the header HS is on sound or image. The 174-bit data portion contains audio data, image data, and program control data. Program control data are information indicating the start or end of the program, transmission time, display time, and the like.

The digital still-picture program is transmitted at the transmission speed of several Mbps, and audio data and image data are both compressed.

In the image compression, each screen is coded one by one, and packets including additional information such as a synchronizing signal, coding parameter, and coding data are transmitted according to the coding format. The audio data is coded in every several ms, and transmitted as a packet having a synchronizing signal, coding parameter, coding data, and the like. However, the synchronizing signal of the coding format of the image data and that of the audio data are not simultaneously transmitted.

FIG. 2 shows the apparatus which records, reproduces, and searches an audio still-picture program transmitted in the above-described packets.

In the recording, a digital data string inputted from the input terminal 100 is synchronized by the synchronizing signal FS in the reception/demodulation circuit 102. The string is received and demodulated in this circuit 102. The demodulated digital data is separated into each packet by the packet separating circuit 104. The header correcting circuit 106 decodes the error correcting codes of the headers HA and HS. The error correcting decoder 108 decodes the error correcting codes which are attached to the header HS and the data portion.

In the packet string in which the error correcting code is decoded in the error correcting decoder 108, a kind of service is identified by the service identification circuit 110 in accordance with the header HA, and the packets of the audio still-picture program are picked up. Then, in the searching information adding circuit 112, information needed for search is added, and the information is transmitted to the recording reproducing circuit 118 through the bus A. This recording reproducing circuit 118 receives a recording control signal from the recording reproduction search control circuit 116 and writes in the recording medium 120 (i.e. magneto-optic disk). The above-described recording processings are controlled by CPU 122.

In the reproduction and search, under the control of the CPU 122, the recording reproducing circuit 118 receives a reproduction control signal from the recording reproduction search control circuit 116 and reads out the data from the recording medium 120. Furthermore, the circuit 118 decodes the error correcting code and transmits the data to the bus A. The searching information read-out circuit 126 reads out necessary information for search through the bus A. The CPU 122 controls search and reproduction on the basis of this searching information.

The packet string which is read out under the control of the CPU 122 on the basis of the searching information is identified whether it is on audio data or image data by the packet identification circuit 126. Then, the packet of audio data is transmitted to the audio decoder 136 and the packet of image data is transmitted to the image decoder 138.

The audio decoder 136 decodes the audio packet and outputs it through the output terminal 140 as audio data. The image decoder 138 decodes the image packet and calculates the timing of image display from the transmitted transmission time data and image display time data. When the time for displaying the image has come, the decoded image packet is outputted from the output terminal 142 as an image signal.

After that, an audio amplifier, speaker, and monitor (not shown) connected to the output terminals 140 and 142 reproduce the audio still-picture program.

However, in the above-described prior art, problems have arisen in the case where a still-picture program or audio still-picture program is recorded or an image is searched for and the program is reproduced from that searching point. This problem is described below in detail.

Generally, in the case of the still-picture program or audio still-picture broadcasting, program control data includes an image transmission time (a reception time) and broadcasting time (an actual time when an image is displayed). In this type of apparatus, demodulated image data is displayed at a specified time according to a designated display switch effect. In the audio reproduction, a received sound is demodulated and reproduced at real time.

That is, the image data is received and stored in a memory in advance and displayed at a specified time. On the other hand, the audio data is reproduced at real time. In other words, the audio data is received much later than the corresponding image data.

There is no problem under such a condition in the case where a still-picture program or audio still-picture data is received and merely outputted. However, the problem has arisen in the case where the image data and audio data are recorded on a magneto-optic disk and the like, and reproduced at an operator's desired time (the designated broadcasting time might have already passed).

As described above, in the case of a still-picture program and an audio still-picture program, an image being displayed on a monitor is not the image being received at real time, but received earlier than the monitor display. Therefore, when a program recording on the recording medium 120 is started, the actual recording is started from the image which is displayed much later. In other words, the still picture which is being displayed at the point where the operator has designated for recording cannot be actually recorded. Furthermore, in the case of a still-picture program (including an audio still-picture program), since a still picture which is displayed on a screen is delivered as a plurality of packets, if the recording on the recording medium 120 is started with the packet which is received after the operator has designated a recording, the recording is started with the packet which is in the middle of a packet group comprising a still picture. If the program recorded in that way is reproduced, the first image cannot be reproduced correctly since the signal of the first image cannot be synchronized. For the above-described reasons, in the case where the still-picture program is recorded, the recording needs to be started at the head of the packets of the still-picture program.

To record the still-picture program from the beginning to the end on the recording medium 120, the recording needs to be started much earlier than the display time. However, there is the other drawback that an unnecessary part of a program may also be recorded.

The problem may arise when the audio still-picture program recorded in the recording medium 120 is reproduced. The reasons will be described along with FIG. 4. In the diagram, Vk (k=1, 2, . . . ) represents an image packet and AL (L=1, 2, 3, . . . ) represents an audio packet. The diagram illustrates the state that the packets are stored in the order of reception.

It is assumed that the image packets are read out from the point A. When the image packets V1, V2, and V3 are read out, the audio packets A1, A2, A3, . . . which are located after the point B are read out. However, the audio packets A1, A2, A3, . . . are simply transmitted later than the image packets V1, V2, V3 timewise. It is not always that the audio packets A1, A2, A3 correspond to the image packets V1, V2, V3. In the case of the audio data, normally, the first packet of a series of audio data includes a synchronizing signal which commands the starting of an audio reproduction. However, in the case where the audio packet A1 does not contain a synchronizing signal, there is the problem that the demodulation processing can not be correctly performed resulting in noise generation.

SUMMARY OF THE INVENTION

Accordingly, it is an object of the present invention to solve the above-described problems and provide an information recording/reproducing apparatus capable of recording an audio still-picture broadcast, and of reproducing an image without noise, in the case of reproduction according to the designation of an operator.

According to the present invention, the foregoing object is attained by providing an information recording/reproducing apparatus which records a packet type audio picture program on a predetermined recording medium and reproduces the audio picture program from the recording medium, comprising: picture reproduction means for reproducing a picture from a designated reproduction starting position, in the case where a reproduction starting position of the picture in the recording medium is designated; detection means for detecting an audio synchronizing signal of audio data which is received after the picture to be reproduced by the picture reproduction means; and sound reproduction means for reproducing audio data after audio data in which an audio synchronizing signal is detected by the detection means.

According to the present invention, the foregoing object is further attained by providing an information recording/reproducing apparatus which receives audio still-picture information comprised of still-picture packets and audio packets transmitted in the form of a packet, and outputs an image signal and audio signal for reproduction, comprising: recording means for recording an audio still-picture on a predetermined recording medium; designation means for designating a desired audio still-picture information which is stored by the recording means; read-out means for successively reading out the packets from the still-picture packet position of the audio still-picture information designated by the designation means; detection means for detecting a packet including an audio synchronizing signal in the packets which are read out by the read-out means; and output means for outputting the still-picture packets read by the read-out means and the audio packets (after the packet detected by the detection means) as image signals and audio signals for the reproduction.

According to the present invention, the foregoing object is further attained by providing an information recording/reproducing apparatus which receives an audio still-picture program comprised of packet type transmission time information, display time information, still-picture information, and audio information, and outputs an image signal and audio signal for reproduction, comprising: recording means for recording the audio still-picture programs on a predetermined recording medium; storage means for storing a table for managing information of the audio still-picture programs which have been recorded in the recording means; designation means for designating audio still-picture information in the audio still picture to be reproduced; searching means for searching a read-out starting position which is recorded in the recording means in accordance with the designated content by the designation means and the table stored in the storage means; read-out means for successively reading out the still-picture packets from the packet at the position searched by the searching means; detection means for detecting a packet including an audio synchronizing signal in the packets which are read out by the read-out means; and output means for outputting the still-picture packet (at the position designated by the designation means) and the audio packets (after the packet detected by the detection means) as an image signal and audio signals for reproduction.

It is another object of the present invention to provide an information recording/reproducing apparatus capable of recording an audio still-picture broadcast, and of reproducing the sound corresponding to an image without noise, in the case of reproduction according to the designation of the operator.

According to the present invention, the foregoing object is attained by providing an information recording/reproducing apparatus which records and reproduces an audio still-picture program comprised of at least transmission time information, display time information, still-picture information, and audio information corresponding to the still-picture information on a predetermined recording medium and reproduces the information from the recording medium, comprising: designation means for designating a reproduction starting position in the recording medium; still-picture reproducing means for reproducing still picture information from the reproduction starting position which is designated by the designation means; calculation means for calculating a recording position of the audio information corresponding to the still picture which is designated by the designation means in accordance with the transmission time and display time; detection means for detecting an audio synchronizing signal recorded after the recording position which is calculated by the calculating means; and audio reproduction means for reproducing the audio data after the detected position, in the case where an audio synchronizing signal is detected by the detection means.

According to the present invention, the foregoing object is further attained by providing an information recording/reproducing apparatus which receives an audio still-picture program comprised of packet type transmission time information, display time information, still-picture information, and audio information, and outputs an image signal and audio signal for reproduction, comprising: recording means for recording audio still-picture programs on a predetermined recording medium; designation means for designating desired audio still-picture information in an audio still picture which is recorded in the recording means; read-out means for successively reading out the packets from the still-picture packet position of the audio still-picture information designated by the designation means; calculation means for calculating the audio packet recording position corresponding to the still-picture packet in accordance with the transmission time and display time of the still-picture packet at the read-out starting position by the read-out means; detection means for detecting a packet including an audio synchronizing signal which is read out after the position calculated by the calculation means; and output means for outputting the still-picture packets (read by the read-out means) and audio packets (after the packet detected by the detection means) as image signals and audio signals for reproduction.

According to the present invention, the foregoing object is further attained by providing an information recording/reproducing apparatus which receives an audio still-picture program comprised of a packet type transmission time information, display time information, still-picture information, and audio information, and outputs image signals and audio signals for reproduction, comprising: recording means for recording the audio still-picture program on a predetermined recording medium; storage means for storing a management table comprised of the transmission time and display time of each of still-picture information and the position information which are stored in the recording means; designation means for designating still-picture information to be reproduced; searching means for searching a read-out starting position which is recorded in the recording means in accordance with the content designated by the designation means and the table stored in the storage means; read-out means for successively reading the packets from the position searched by the searching means; calculation means for calculating the recording position of the audio packet corresponding to the still-picture packet to be read out by the read-out means in accordance with the transmission time and display time which are stored in the table; detection means for detecting a packet including an audio synchronizing signal which is read out after the position calculated by the calculation means; and output means for outputting the still picture packets (which are read out by the read-out means) and the audio packets (after the packet detected by the detection means) as image signals and audio signals for reproduction.

It is another object of the present invention to provide an information recording/reproducing apparatus capable of recording a whole program without unnecessary parts of the program, in the case where a still-picture program is recorded on a predetermined recording medium.

According to the present invention, the foregoing object is attained by providing an information recording/reproducing apparatus which records a received packet type picture program on a predetermined recording medium, and reproduces the program from the recording medium, comprising: detection means for detecting a start and an end of a received picture program; designation means for designating a recording start or recording end of the received picture program; and control means for controlling a timing of the recording start or recording end by the designation means in accordance with a detected result of the detection means.

It is another object of the present invention to provide an information recording/reproducing apparatus capable of substantially recording the only desired program, in the case where an audio still-picture program is recorded on a predetermined recording medium, and of preventing generation of noise at the beginning of the reproduction.

According to the present invention, the foregoing object is attained by providing an information recording/reproducing apparatus which records a received packet type audio still-picture program on a predetermined recording medium, and reproduces the program from the recording medium, comprising: first detection means for detecting a start and end of a received still-picture program; designation means for designating a recording start or recording end of the received still-picture program; control means for controlling a timing of the recording start or recording end by the designation means in accordance with a detected result of the first detection means; still-picture reproducing means for reproducing still-picture data recorded in the recording medium; second detection means for detecting an audio synchronizing signal of the audio data located after the still picture with which the reproduction is started by the still-picture reproducing means; and audio reproduction means for reproducing the audio data located after the audio data in which an audio synchronizing signal is detected by the second detection means.

It is another object of the present invention to provide an information recording/reproducing apparatus capable of substantially recording the only desired program, in the case where an audio still-picture program is recorded on a predetermined recording medium, and of reproducing the sound corresponding to an image to be reproduced without noise.

According to the present invention, the foregoing object is attained by providing an information recording/reproducing apparatus which records audio still-picture programs comprised of at least transmission time information, display time information, still-picture information, and audio information corresponding to the still-picture information on a predetermined recording medium, and reproduces the programs from the recording medium, comprising: first detection means for detecting a start and end of a received still-picture program; first designation means for designating a recording start or recording end of the received still-picture program; control means for controlling a timing of the recording start or recording end by the first designation means in accordance with a detected result of the first detection means; second designation means for designating a still picture in a program to be reproduced in the recording medium; still-picture reproducing a means for reproducing still picture of the program designated by the second designation means; calculation means for calculating the recording position of the audio information corresponding to the still picture which is designated by the second designation means in accordance with the transmission time and display time; third detection means for detecting an audio synchronizing signal recorded after the recording position which is calculated by the calculation means; and audio reproduction means for reproducing the audio data located after the detected position, in the case where an audio synchronizing signal is detected by the third detection means.

Other features of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram illustrating the content of the search table which is generated in the present embodiment;

FIG. 6 is a flowchart illustrating the processing for detecting a program state at the audio still-picture recording in the present embodiment;

FIGS. 9A and 9B are diagrams illustrating the examples of the menu which is displayed at the image reproduction;

FIG. 11 is a flowchart illustrating the detailed recording processing of the audio still-picture information in the present embodiment.

DESCRIPTION OF THE PREFERRED EMBODIMENTS

Preferred embodiments of the present invention will now be described in detail in accordance with the accompanying drawings.

Figure 1:
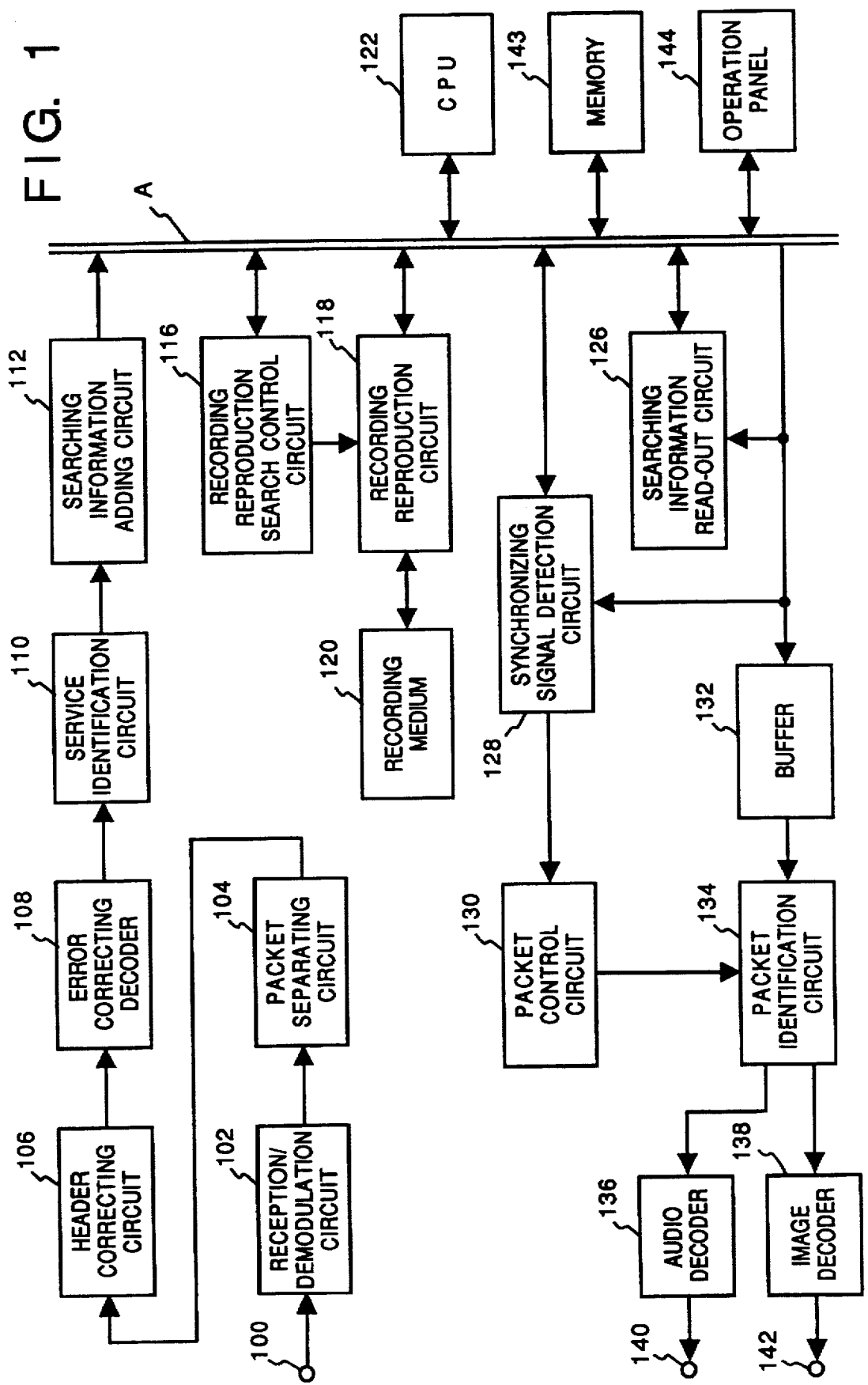
FIG. 1 is a block diagram illustrating the information recording/reproducing apparatus according to the present embodiment.
Figure 2:
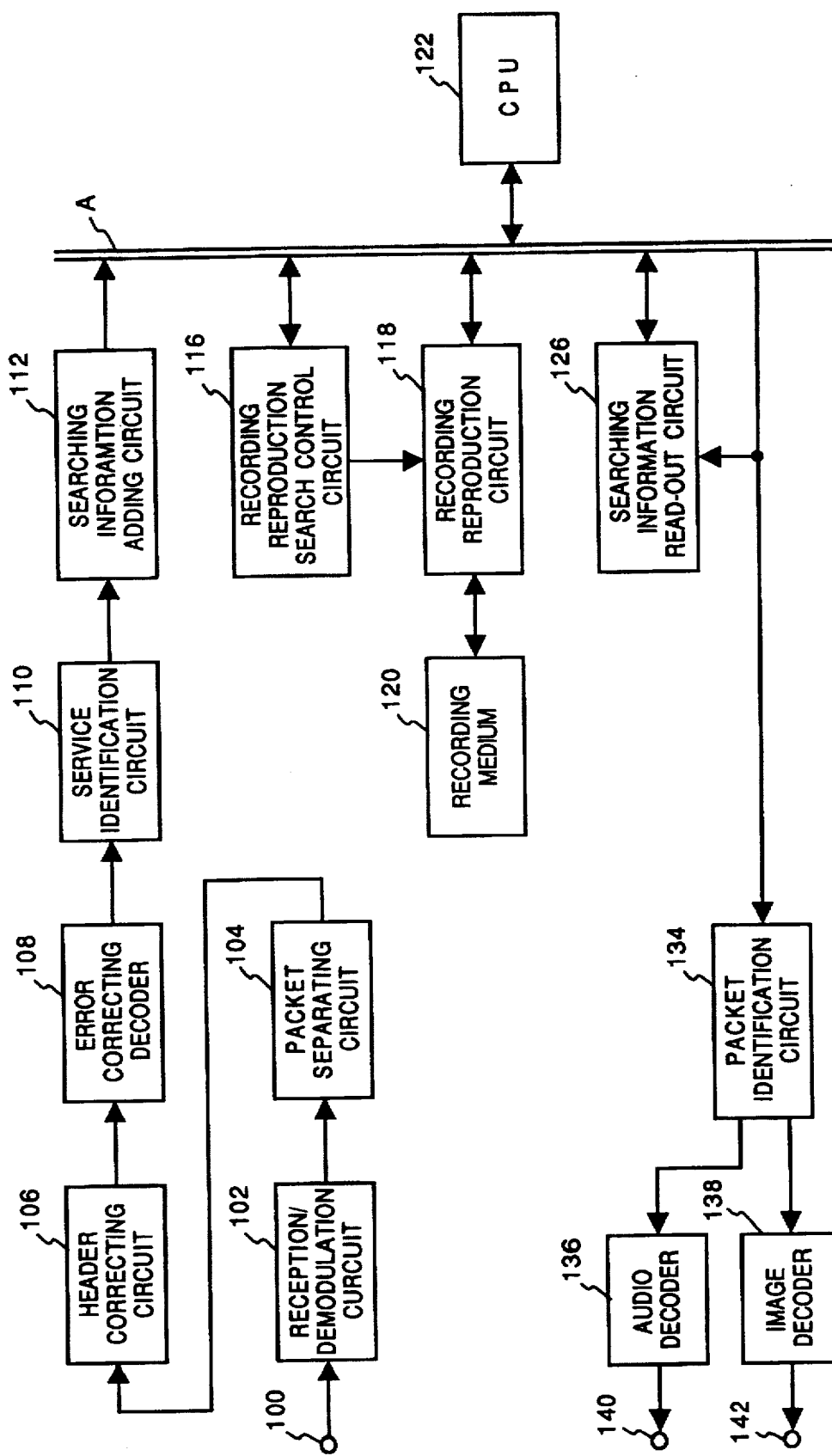
FIG. 2 is a block diagram illustrating the conventional information recording/reproducing apparatus.
Figure 3:
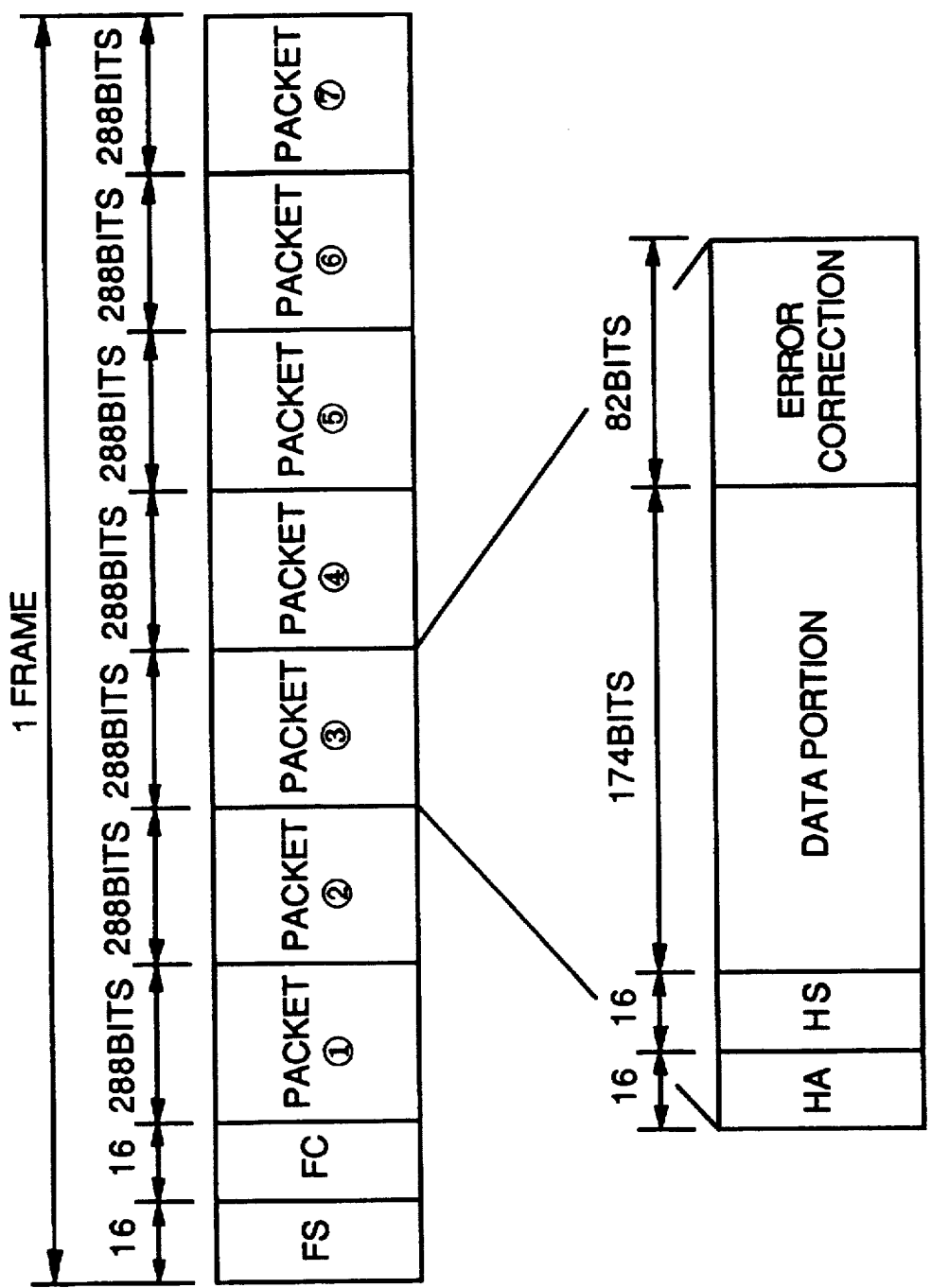
FIG. 3 is a diagram illustrating a packet format and transmission format of an audio still-picture broad.

FIG. 1 is a block diagram illustrating the information recording/reproducing apparatus according to the present embodiment. Like reference characters designate the same or similar parts throughout the drawings.

The still-picture program or audio still-picture program which is provided by a satellite channel or CATV contains a plurality of frame data which contains the packet having the information which indicates a start of the program, a broadcasted time (a received time) (which is referred to as a "transmission time" hereinafter) and a time for displaying an image (which is referred to as a "display time" hereinafter). These types of data can be determined by examining the data portion if the header HS in the packet represents the program control information. After this, if each header HS of the successively received data is examined, whether a program has ended can be determined. Since the structure of the still-picture program is the same as the one that the information on sound is removed from the audio still-picture program, only the structure of the audio still-picture program is described below.

In the present embodiment, when recording is directed from an operation panel 144, data is recorded on a recording medium 120 from the point where the recording was directed. However, even if recording has been directed, it is not started until when the information indicating the head of a program is received. By the way, in the audio still-picture program, a plurality of screens of still picture and audio data corresponding to those screens are included. There is a packet including a transmission time and display time for a still picture right before each still-picture data.

After recording is directed, when the packet indicating the head of the program is detected, and when each still-picture data in the program is detected, the CPU 122 forms a search table in the memory 143 in order to simplify later search.

FIG. 5 illustrates the search table. As shown in FIG. 5, the information registered in the search table is comprised of information ID 1 for identifying each program, kind of a program (whether or not it is an audio still picture), information ID 2 for identifying each still picture included in the program, transmission time for each still picture, display time, write-start address to the recording medium (magneto-optic disk) 120. Among those, transmission time and display time are obtained from the packet included in the reception data and ID 1, ID 2, and write-start address are added in this apparatus.

Figure 7:
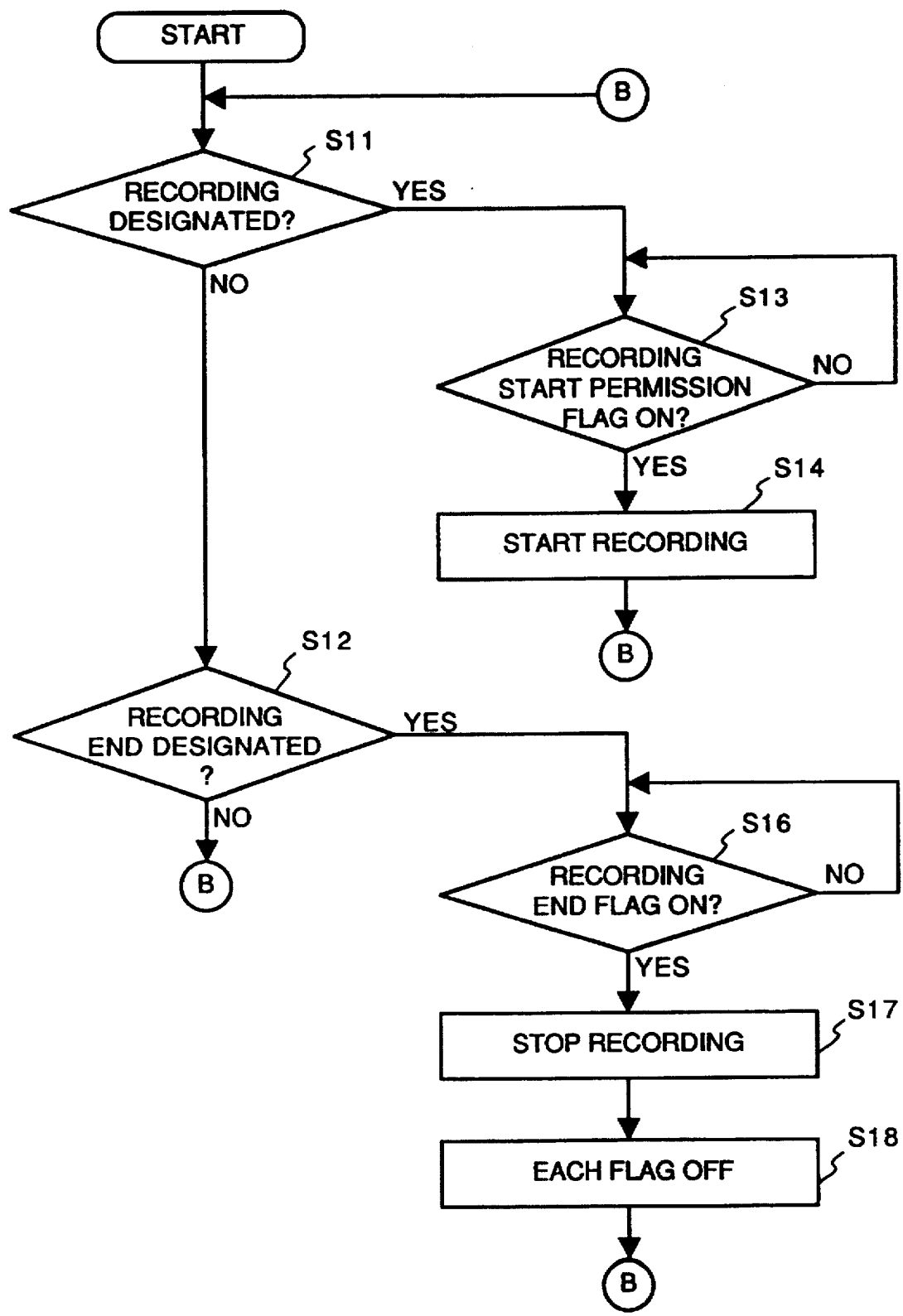
FIG. 7 is a flowchart illustrating the recording processing of the audio still-picture information in the present embodiment.

The recording processing is described along with the flowcharts in FIGS. 6, 7 and 11. The packet indicating a start of a program is referred to as a "start packet" and the packet indicating an end of the program is referred to as an "end packet" hereinafter.

FIG. 6 is a flowchart illustrating a processing which supervises received packets. This processing is started when the recording start is directed by the operation panel 144.

First, the CPU 122 determines whether a start packet is detected at step 1 and an end packet is detected at step 3 in accordance with the signal from the service identification circuit 110. In the case where a start packet is detected at step Si, the CPU 122 turns on a recording start permission flag which is set in advance in the memory 143 at step S2. On the other hand, in the case where an end packet is detected at step S3, the CPU 122 turns on a recording end flag which is set in advance in the memory 143 at step 4.

The recording processing is described along with the flowchart in FIG. 7.

As shown in FIG. 7, while neither recording nor stopping is directed from the operation panel 144, the processing by the CPU 122 is in the loop. In this state, in the case where the recording is directed from the operation panel 144, the processing proceeds from step S11 to step S13 where the CPU 122 is placed in the wait state until when the recording start permission flag is turned on. When the recording start permission flag becomes ON, that is, when the start packet is detected, the processing proceeds to step S14 where the received packets are successively recorded on the recording medium 120.

While a program is being recorded, a plurality of screens of still pictures are sequentially transmitted. There is a packet having at least transmission time and display time information of the still picture right before each still picture. Therefore, the still-picture packet which is transmitted right after the packet having these time information is a first still-picture packet of a group of still-picture packets comprising a screen of the still picture. In this way, the signals of the still pictures are synchronized correctly and still pictures with excellent features can be reproduced. In other words, detecting the packet including the transmission time and display time means that a screen of the still picture is transmitted. In the reproduction processing which will be described later, the search table is updated so that reproduction can be started from a desired still picture in the program.

The recording processing is described along with the flowchart of FIG. 11 in detail. This processing is started by the start designation at step S14 in FIG. 7.

First of all, the packet received at step S101 is written in the recording medium 120. At step S102, it is determined whether the written packet contains the program control information including a transmission time and display time. In the case of "YES", the process proceeds to step S103 where the search table is updated, and the process returns to step S101.

The updating processing of the searching table is described below.

First, a row for the data to be newly registered is reserved at the bottom of the search table. In the case where the still picture to be registered is the beginning of the still picture of the program, ID 1 is not updated, but ID 2 is set to as "1". Then, the transmission time, display time, and write-start address are written in the table.

ID 1 and ID 2 can be updated by adding "1" to the corresponding ID value which is registered prior to the current registration.

The search table shown in FIG. 5 is formed in the above-described manner. However, ID 2 is not always required if an operator can select a program to reproduce in another way.

Thus, when updating the search table for the program is completed, the process returns to step S11.

On the other hand, in the case where the recording stop is directed from the operation panel 144, the process proceeds from step S12 to step S16 where the CPU 122 is placed in the waiting state until the recording end flag becomes ON. When the recording end flag becomes ON, that is, when the end packet is detected, the process proceeds to step S17 where the recording processing is stopped. At step S18, the recording start permission flag and recording end flag are initialized to the OFF state.

From the above-described processings, it is prevented that an unnecessary data is recorded in the case of still-picture program and the data is cut at the middle of the program.

As described above, when the recording is directed, the search table is updated whenever a new program is received.

The reproduction processing of the recorded audio still-picture program is described below. If the recording is stopped and the operator designates the reproduction of the recorded data, the CPU 122 generates an image signal of the menu shown in FIG. 9A according to the registered content. Then, it is displayed on the screen of the display apparatus connected to the output terminal 142 of the image decoder 138.

What are displayed on the display screen are program numbers and times. Each program number corresponds to the ID 1 of the search table and the time is a display time registered with the search table. The reason why the transmission time is not displayed is that it is meaningless information for the operator.

From this display screen, the operator designates a desired program number from the operation panel 144. When one of the program number is designated, a list of the plurality of still pictures included in that program is displayed as FIG. 9B. FIG. 9B shows the case where the "program 1" is selected. From the screen shown in FIG. 9B, the operator inputs the still-picture number to be reproduced. The still-picture number corresponds to ID 2 in FIG. 5. By this operation, the still picture on and after the designated still picture can be reproduced.

In this embodiment, the still picture to be reproduced is designated by the numbers. However, if the still picture can be designated, the method for designation is not limited to this embodiment. For example, it can be set so that whenever a key is depressed, the information for identifying a still picture is successively changed. In this case, the ID 2 in the search table is not necessary.

By the way, if the still picture number to be reproduced is inputted, the CPU 122 searches a pertinent still picture by examining the search table according to the inputted program number and still-picture number.

As a result, since the write-start address of the recording medium 120 for the designated still picture is obtained, the data is successively read out and is reproduced from that address location.

Figure 4:
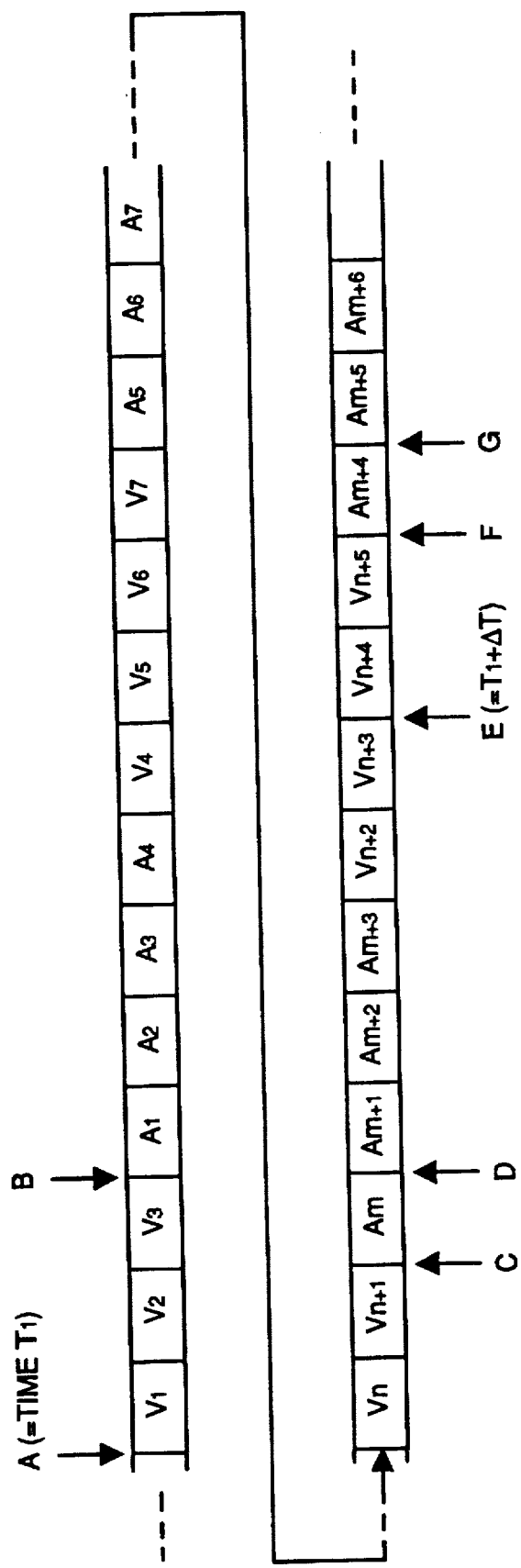
FIG. 4 is a diagram illustrating the recording state of the image packet and audio packet.

The reproduction processing is described along with FIG. 4. In this diagram, VL (L=1, 2, 3, . . . ) represents a still-picture packet and AK (K=1, 2, 3, . . . ) represents an audio packet.

It is assumed that the starting point for reproduction is the point A. In this case, problems may arise when the audio packets located after the point B are reproduced as well as the still-picture packets V1, V2, V3 are reproduced.

The reason is that the audio packet A1 may be a packet corresponding to the still-picture packet which has been broadcasted before the still-picture packet V1. In that case, the audio packet A1 does not contain an audio synchronizing signal. If the audio packet is demodulated as it is, it is reproduced as a meaningless noise. It should be noted that the audio synchronizing signal is a signal indicating a beginning of the sound packet.

Therefore, in this embodiment, when the point A for reproducing the still picture is searched, the audio packets after the point A are successively examined. Then, the reproduction is started with the audio packet located after the audio packet in which a synchronizing signal is detected in a series of detection. In FIG. 4, if it is assumed that the audio packet Am contains an audio synchronizing signal, the reproduction is started from the audio packet Am+1, that is, from the point D.

The more detailed processing is described below.

It is assumed that the packet read-out is started from the point A shown in FIG. 4. The read-out packets are successively stored in the buffer 132. In this case, the synchronizing signal detection circuit 128 monitors the header of each packet which is stored into the buffer 132. If the circuit 128 detects a packet with an audio synchronizing signal, the signal indicating this is transmitted to the packet control circuit 130.

The packet identification circuit 134 transmits the still-picture packets stored in the buffer 132 to the image decoder 138 and audio packets stored in the buffer 132 to the audio decoder 136 under the control of the packet control circuit 130. However, the packet control circuit 130 prohibits outputting the audio packets to the audio decoder 136 by masking the read-out audio packets until when the synchronizing detection circuit 128 detects an audio synchronizing signal. Furthermore, in the present embodiment, the data in the audio packet is masked (replaced by "0") so that the sound is not outputted. However, it can be arranged that an opening/closing of the output terminal 140 is controlled.

Figure 8:
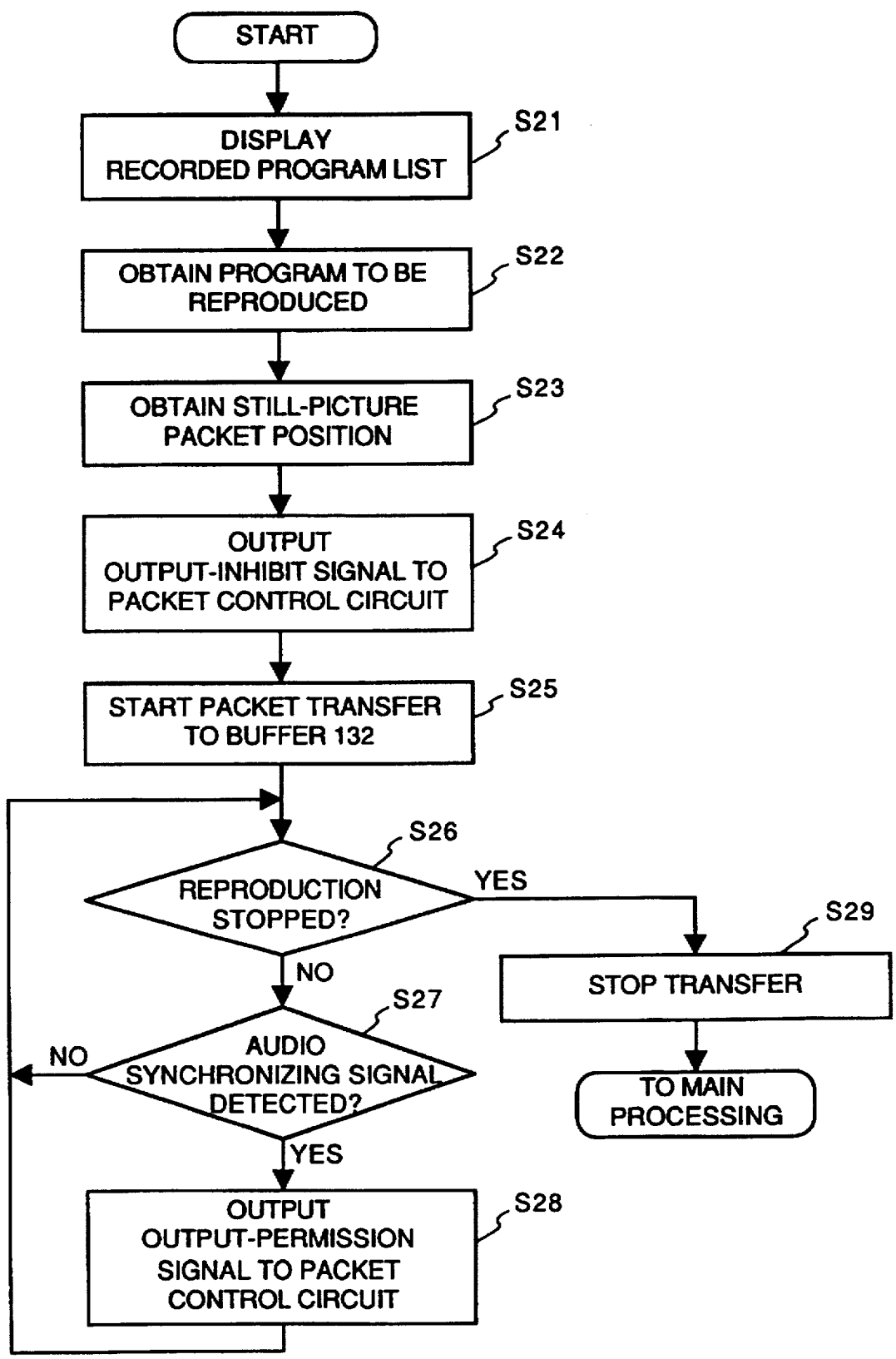
FIG. 8 is a flowchart illustrating the reproduction processing in the present embodiment.

The reproduction processing is described along with FIG. 8.

When reproduction is directed by the operator, the image signal of the recorded program list at step S21 is generated according to the content of the search table, and outputted through the image output terminal 142. As a result, on the display apparatus connected to the image output terminal 142, the image shown in FIG. 9 is displayed.

At step S22, the program No. to be reproduced, which is designated by the operator by the operation panel 144, is detected. At step S23, the designated program is identified by referring to the content of the search table and the designated program No. At step S24, the synchronizing signal detection circuit 128 is reset to the state where no audio synchronizing signal is detected, and a signal indicating that is outputted to the packet control circuit 130.

After this, the process proceeds to step S25 where the packet transmission is started from the packet at the address location of the recording medium 120 which is obtained by search. At step S26, it is determined whether the operator has directed to stop the reproduction through the operation panel 144. In the case where the reproduction is to be stopped, the process proceeds to step S29 where the packet transmission to the buffer 132 is stopped and the processing returns to the main routine.

In the case where the stop is not directed, the process proceeds to step S27 where it is determined if the audio synchronizing signal is detected. If the audio synchronizing signal is detected, the process proceeds to step S28 where the signal permitting output is outputted to the packet control circuit 130. In this way, the packet control circuit 130 outputs the signal to drive the packet identification circuit 134 after the predetermined period of time has passed. The packet transmission processing is continued until the reproduction stop is directed. As a result, when the processing at step S28 is once executed, the reproduction of the sound and still-picture is performed.

As described above, according to the present embodiment, in the case where the audio still-picture is searched and reproduced, the audio packet is masked so that the sound will not be reproduced until the audio synchronizing signal is detected, but will be reproduced from the audio packet located after the packet including the audio synchronizing signal. In this way, a normal sound is reproduced, since the audio packet is not mistakenly reproduced and noise generation is prevented.

Furthermore, in the present embodiment, in the case where the recording is directed by the operation panel, the recording is started when the packet indicating the beginning of the program is detected. However, it can be arranged so that the recording is permitted even in the middle of the program. Of course, the first still-picture packet to be recorded is the still-picture packet received after the still-picture packet having an image synchronizing signal indicating a display time, transmission time, and the like. In this case, the switch effect with the screen before the recording cannot be expected, however, the switch effect of the still picture which is received thereafter that can be obtained.

Furthermore, as described above, in still-picture program and audio still-picture broadcasting, the still-picture data is transmitted much earlier than the actual display time. Therefore, if the program which is displayed at a certain time has begun to be recorded at the display-start time, the still-picture cannot be completely recorded. In the case where the display time is set by the operator, it needs to be arranged so that the apparatus is in a waiting state at a time earlier than the set display time and the received packets are monitored. In the case where the still-picture packet having the set display time is transmitted, the recording is started from that packet. To realize this, a timer can be arranged in the apparatus. In this case, since it can be determined whether the time is a predetermined period earlier than the recording start time designated by a user at step S11 in FIG. 7, the details are omitted.

In the above-described embodiment, a recording start or end is directed by the operation panel 144. In the case where the information indicating the program start and program number are added to the head of the program, it can be set so that the program number is registered by the operation panel in advance and in the period between when the program start packet having the registered number is received and when the program is ended. In this case, recording set for a plurality of programs can be enabled.

Furthermore, in the case where recording stop is designated by the operation panel, the recording is stopped when the end of the program is detected in the present embodiment. However, it can be set that the recording stop is forced.

Second Embodiment

In the first embodiment, the head of the still-picture packet to be reproduced is searched with reference to the search table and the reproduction is started with the still-picture packet on the searched location. In the audio reproduction, it is arranged so that the reproduction is not started with the first audio packet, but with the audio packet next to the first packet containing the audio synchronizing signal. In this way, the audio signal is synchronized and the sound can be reproduced without noise.

However, as described above, in the case of the audio still-picture, the transmission time of an audio packet (the time to be transmitted) is the time to be outputted, while the still-picture packet corresponding that audio packet is transmitted much earlier than that. That is, the audio packet which is searched in the first embodiment (the packet Am+1 of FIG. 4) is not always for the still-picture packet which is reproduced from the still-picture packet V1. It may be the case where the audio packet which is recorded on the recording medium 120 after the packet Am+1 is for the still-picture packet V1.

The object of the second embodiment is to reproduce the audio packets from the packet which is corresponding to the still picture to be reproduced and the reproduction is performed in the state that the still picture and sound to each other.

As described earlier, when a still-picture packet is transmitted, the packet including the transmission time information and packet including the display time information in the beginning of the frame are transmitted.

If it is assumed that the transmission time of an audio still-picture program is T1 and the display time T2, the audio packet corresponding to the still picture to be reproduced is transmitted at least after ΔT (=T2−T1) since when the first still-picture packet has been transmitted. That is, the audio packet is transmitted after the time T1+ΔT.

In the second embodiment, in the case where an audio still-picture packet is reproduced from the packet V1, the reproduction is started with the next audio packet of the audio packet including a synchronizing signal, which is located where the time passed for ΔT from the position of the still-picture packet V1.

For example, in FIG. 4, when the still picture is reproduced from the packet V1, it is assumed that the transmission time is T1, the display time is T2, the time T1+ΔT is the point E. In this case, when the packets located after the point E are examined and the packet Am+4 including an audio synchronizing signal at the point F is detected, the sound is reproduced from the audio packet Am+5 at the point F.

Figure 10:
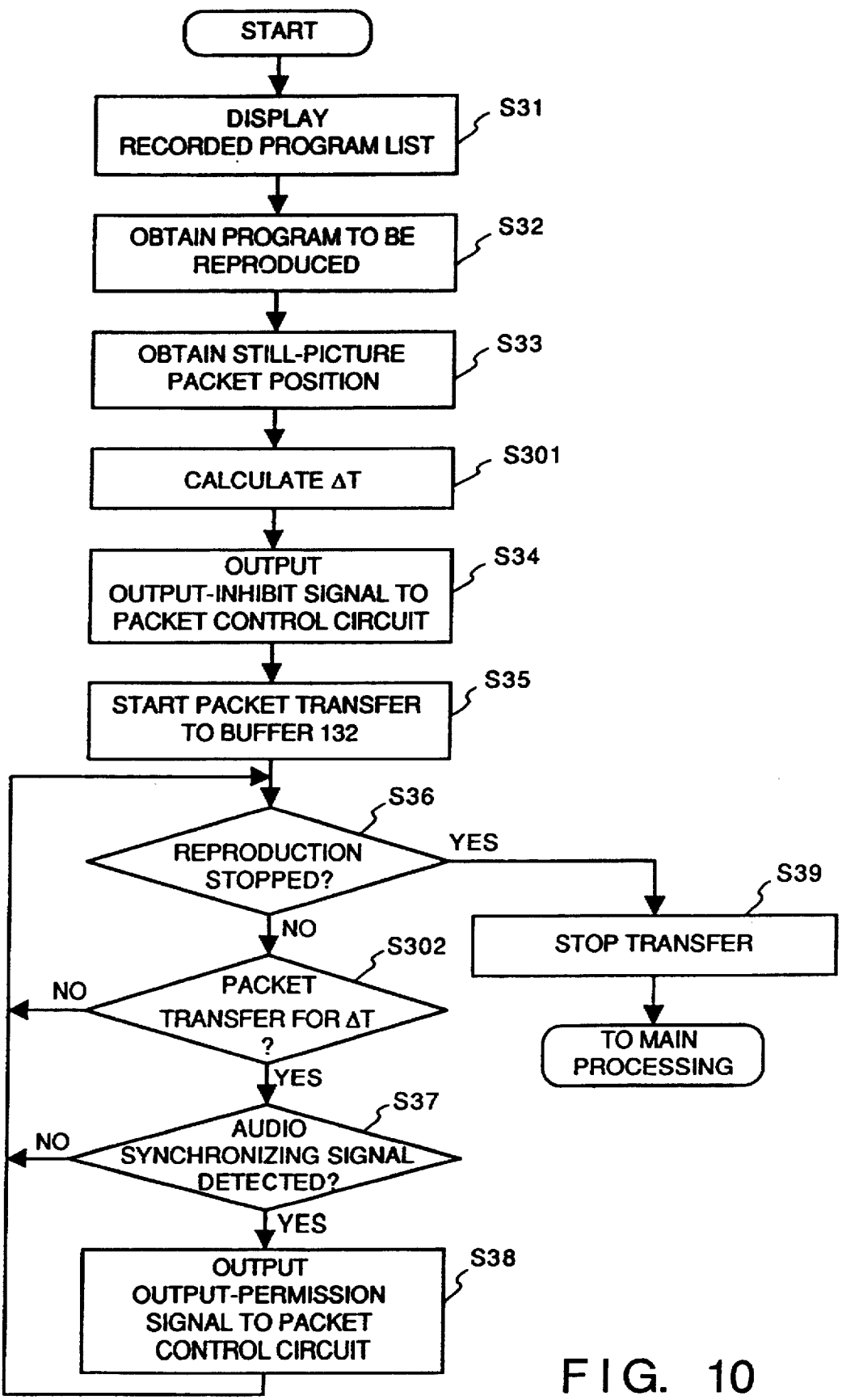
FIG. 10 is a flowchart illustrating the reproduction processing in the second embodiment.

More detailed generation processing is described along with the flowchart in FIG. 10.

The steps S31–39 in FIG. 10 correspond to the steps S21–S29 in FIG. 8. The difference is that the steps S301 and S302 are added in FIG. 10.

First, when the operator directs to reproduce an image, an image signal of the recorded program list is generated at step S31 according to the search table and outputted through the image output signal terminal 142, and the images shown in FIGS. 9A and 9B are displayed.

At step S32, the still picture designated by the operator through the operation panel 144 is detected. At step S33, the designated still picture is identified with the reference to the search table. At step S301, the delay time ΔT of the sound packet to be transmitted is calculated by subtracting the transmission time of the designated still picture from the display time. The transmission time and display time are stored in the search table. At step S34, the synchronizing signal detection circuit 128 is reset to the state where an audio synchronizing signal is not detected and the signal indicating this is outputted to the packet control circuit 130.

After this, the processing proceeds to step S35 where the packet transfer is started from the packet at the searched address location of the recording medium 120. At step S36, it is determined whether the operator has directed to stop the reproduction. In the case where the reproduction stop is directed, the process proceeds to step S39 where the packet transfer to the buffer 132 is stopped and the process returns to the main routine.

In the case where the reproduction stop is not directed, the process proceeds to step S302 where it is determined whether the packets corresponding to the calculated time ΔT are transmitted to the buffer 132, and the apparatus waits for transfer of these packets.

In this way, when the packets corresponding to the time ΔT are completely transferred, the process proceeds to step S37 where it is determined whether an audio synchronizing signal is detected. If the audio synchronizing signal is detected, the process proceeds to step S38 where the signal which permits outputting is outputted to the packet control circuit 130. In this way, after a predetermined period of the time has passed, the packet control circuit 130 outputs the signal to drive the packet identification circuit 134. The packet transfer processing is repeated until the reproduction stop is directed.

As described above, according to the second embodiment, in the case where an audio still-picture program is reproduced, it becomes possible that the sound correspond-ing to a certain still picture is accurately reproduced without noise.

Furthermore, in the search according to the present embodiment, it is arranged that the image information to be reproduced is designated in advance, and then, the audio information corresponding to that image information can be searched. However, the present invention is not limited to this embodiment. It can be set to designate the audio information to be reproduced in advance and the image information corresponding to that audio information is reproduced.

Although the invention has been described in its preferred form with a certain degree of particularity, it is understood that the present disclosure of the preferred form may be changed in the details of construction and the combination and arrangement of the parts may be modified without departing of the spirit and scope of the invention a hereinafter claimed.

The present invention is not limited to still pictures. It can be applied to e.g. the case of moving pictures.

What is claimed is:

1. A reproducing apparatus which reproduces audio data and image data recorded on a recording medium, the audio data being coded, and recorded as a plurality of packets, an audio synchronizing signal for identifying a top of a gathering of audio packets also being recorded on the recording medium, and the image data being dispersedly recorded between audio packets, said apparatus comprising:

image data reproducing means for reproducing image data from a designated reproduction start position on said recording medium;

detection means for sequentially searching image and audio packets, from the designated reproduction start position, for detecting a packet having an audio synchronizing signal; and sound reproducing means for preventing audible reproduction of audio packets positioned after the designated reproduction start position and prior to a packet having the audio synchronizing signal and accessed by said detection means while sequentially searching the image and audio packets for the packet having the audio synchronizing signal, so as not to reproduce noise, and reproducing audio data from an audio packet positioned after the packet having the audio synchronizing signal detected by said detection means.

2. Apparatus according to claim 1, further comprising a recording means for recording audio data and image data on said recording medium.

3. Apparatus according to claim 1, wherein said image data reproducing means reproduces image data in synchronization with audio data reproduced by said sound reproducing means.

4. Apparatus according to claim 1, wherein said recording medium stores image data corresponding to a plurality of images.

5. Apparatus according to claim 1, further comprising display means for displaying a list of images recorded on the recording medium.

6. A reproducing method for reproducing audio data and image data recorded on a recording medium, the audio data being coded and recorded as a plurality of packets, an audio synchronizing signal for identifying a top of a gathering of audio packets also being recorded on the recording medium, and the image data being dispersedly recorded between audio packets, said method comprising the steps of:

reproducing image data from a designated reproduction start position on said recording medium;

sequentially searching image and audio packets, from the designated reproduction start position, for detecting a packet having an audio synchronizing signal;

preventing audible reproduction of audio packets positioned after the designated reproduction start position and prior to a packet having the audio synchronizing signal and accessed by said searching step while sequentially searching the image and audio packets for the packet having the audio synchronizing signal, so as not to reproduce noise; and reproducing audio data from an audio packet positioned after the packet having the audio synchronizing signal detected in said searching step.

7. A method according to claim 6, further comprising the step of recording audio data and image data on the recording medium.

8. A method according to claim 6, wherein said image data reproducing step includes the step of reproducing image data in synchronization with audio data reproduced by said audio data reproducing step.

9. A method according to claim 6, wherein said recording medium stores image data corresponding to a plurality of images.

10. A method according to claim 6, further comprising the step of displaying a list of images recorded on the recording medium.

11. An apparatus according to claim 1, wherein said sound reproducing means includes determination means for determining whether or not the packet positioned after the packet having the audio synchronizing signal detected by said detection means is an audio packet; and skip means for skipping the packet if the packet is not an audio packet.

12. A method according to claim 6, wherein said step of reproducing audio data includes a step of determining whether or not the packet positioned after the packet having the audio synchronizing signal detected in said searching step is an audio packet, and a step of skipping the packet if the packet is not an audio packet.

* * * * *

UNITED STATES PATENT AND TRADEMARK OFFICE
CERTIFICATE OF CORRECTION

PATENT NO. : 5,895,123

DATED : April 20, 1999

INVENTOR(S) : AKIO FUJII, ET AL.

It is certified that error appears in the above-identified patent and that said Letters Patent is hereby corrected as shown below:

COLUMN 1,
Line 18, "are packet" should read --more packets--.

COLUMN 2,
Line 32, "identified" should read --identified as to--, and "on" should be deleted.

COLUMN 3,
Line 52, "can not" should read --cannot--.

COLUMN 7,
Line 4, "a" should be deleted, and "reproducing" should read --reproducing a--; and
Line 31, "broad;" should read --broadcast;--.

COLUMN 8,
Line 49, "Si," should read --S1,--.

COLUMN 10,
Line 7, "number" should read --numbers--.

COLUMN 12,
Line 47, "corresponding" should read --corresponding to--.

UNITED STATES PATENT AND TRADEMARK OFFICE
CERTIFICATE OF CORRECTION

PATENT NO. : 5,895,123

DATED : April 20, 1999

INVENTOR(S) : AKIO FUJII, ET AL.

It is certified that error appears in the above-identified patent and that said Letters Patent is hereby corrected as shown below:

<u>COLUMN 14</u>,
Line 16, "a" should be deleted.

Signed and Sealed this

Twenty-eighth Day of December, 1999

Attest:

Q. TODD DICKINSON

*Attesting Officer*   *Acting Commissioner of Patents and Trademarks*